(12) United States Patent
Kismarton

(10) Patent No.: US 8,541,091 B2
(45) Date of Patent: *Sep. 24, 2013

(54) COMPOSITE LEG FOR LANDING GEAR ASSEMBLY

(75) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,630

(22) Filed: Mar. 26, 2012

(65) Prior Publication Data

US 2012/0234972 A1  Sep. 20, 2012

Related U.S. Application Data

(63) Continuation of application No. 12/341,885, filed on Dec. 22, 2008, now Pat. No. 8,163,368, which is a continuation-in-part of application No. 11/145,058, filed on Jun. 3, 2008, now Pat. No. 7,467,763, and a continuation-in-part of application No. 12/340,631, filed on Dec. 19, 2008, now Pat. No. 7,807,249, which is a continuation-in-part of application No. 11/096,727, filed on Mar. 31, 2005, now abandoned.

(51) Int. Cl.
B32B 9/00 (2006.01)
B64C 25/52 (2006.01)

(52) U.S. Cl.
USPC .......................................... 428/113; 244/108

(58) Field of Classification Search
USPC .................... 244/100 R, 104 LS, 108, 104 R, 244/103 R, 107; 446/55; 428/123, 292.1, 428/293.1; 52/831, 841, 837
See application file for complete search history.

(56) References Cited

U.S. PATENT DOCUMENTS

| | | | | |
|---|---|---|---|---|
| 3,238,690 A * | 3/1966 | Wilkins | | 52/847 |
| 4,401,495 A * | 8/1983 | McKinney | | 156/173 |
| 5,224,669 A * | 7/1993 | Guimbal | | 244/108 |
| 6,468,613 B1 * | 10/2002 | Kitano et al. | | 428/35.8 |
| 8,163,368 B2 * | 4/2012 | Kismarton | | 428/113 |

* cited by examiner

*Primary Examiner* — Tien Dinh
(74) *Attorney, Agent, or Firm* — Hugh P. Gortler

(57) ABSTRACT

A composite leg for a landing gear assembly includes a composite compression cap including reinforcing fibers that provide strength in compression, and a tension cap including reinforcing fibers that provide strength in tension. At least some of the fibers are oriented at +α and −α with respect to a longitudinal axis of the leg, where α is between 2 and 8 degrees.

20 Claims, 4 Drawing Sheets

| | $\epsilon_t$ | $\epsilon_c$ | DENSITY | MODULUS(E) |
|---|---|---|---|---|
| CB | 0.008 | 0.006 | 0.055 | 20 |
| $GS_1$ | 0.025 | 0.020 | 0.075 | 5 |
| $P_1$ | 0.035 | 0.025 | 0.035 | 5 |

COMPOSITE LEG FOR LANDING GEAR ASSEMBLY

This is a continuation of U.S. Ser. No. 12/341,885 filed Dec. 22, 2008 now U.S. Pat. No. 8,163,368. U.S. Ser. No. 12/341,885 is a continuation-in-part of U.S. Ser. No. 11/145,058 filed 3 Jun. 2005, now U.S. Pat. No. 7,467,763 and U.S. Ser. No. 12/340,631 filed 19 Dec. 2008, now U.S. Pat. No. 7,807,249. U.S. Ser. No. 12/340,631 is a continuation-in-part of U.S. Ser. No. 11/096,727 filed 31 Mar. 2005, now abandoned.

This invention was made with Government support under contract number MDA972-98-9-0004 awarded by the Defense Advanced Research Projects Agency. The government has certain rights in this invention.

BACKGROUND

A traditional landing gear assembly for an aerospace vehicle includes components made of steel forgings. However, the steel forgings are heavy, and they have high tooling costs.

Composite material may be used instead due to its high strength and light weight. A landing gear leg, for example, may be made from a material such as fiberglass.

SUMMARY

According to an embodiment herein, a composite leg for a landing gear assembly includes a composite compression cap including reinforcing fibers that provide strength in compression, and a tension cap including reinforcing fibers that provide strength in tension. At least some of the fibers are oriented at +α and −α with respect to a longitudinal axis of the leg, where α is between 2 and 8 degrees.

According to another embodiment herein. a landing gear assembly leg comprises a composite compression cap including reinforcing fibers oriented at +α and −α with respect to a longitudinal axis of the leg, and a composite tension cap including reinforcing fibers oriented at +α and −α with respect to the longitudinal axis of the leg. The angle α is between 2 and 8 degrees.

DETAILED DESCRIPTION

Figure 1:
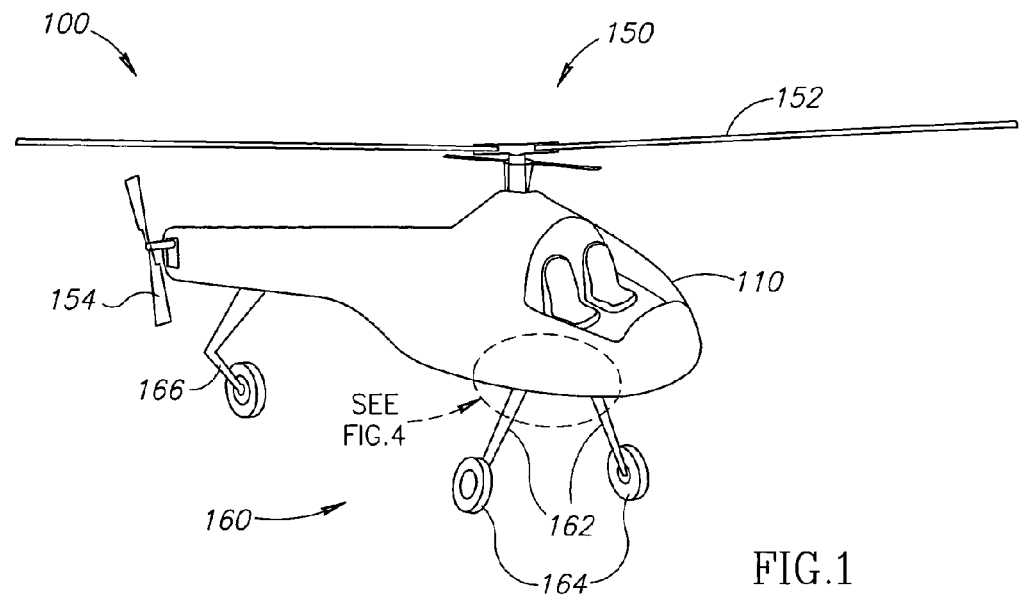
FIG. 1 is an isometric view of an aircraft having a landing gear assembly.

FIG. 1 is an isometric view of an aircraft 100. In this embodiment, the aircraft 100 includes a fuselage 110 and a rotary lift and propulsion system 150 having a main rotor 152 and a tail rotor 154. A landing gear assembly 160 projects outwardly from the fuselage 110 and includes a pair of composite legs 162. A landing wheel 164 is operatively coupled to each composite leg 162 and a tail landing gear 166 projects downwardly from an aft portion of the fuselage 110. Alternately, the aircraft 100 may be another type of aircraft having a landing gear assembly.

Figure 2:
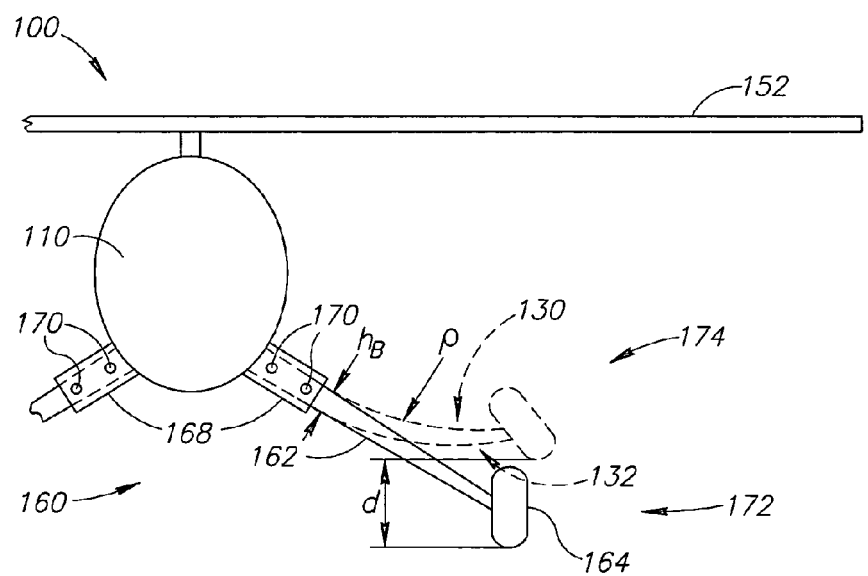
FIG. 2 is a front elevational schematic view of a portion of the aircraft of FIG. 1.
Figure 3:
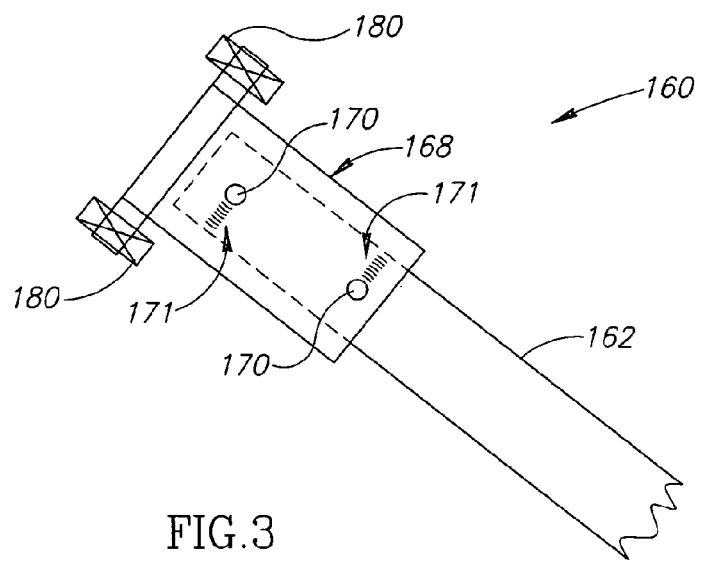
FIG. 3 is an enlarged, partial elevational view of a portion of the landing gear assembly of FIG. 1.

FIG. 2 is a front schematic view of the aircraft 100 and landing gear assembly 160 of FIG. 1. FIG. 3 is an enlarged, partial elevational view of a portion of the landing gear assembly 160 of FIG. 2. In this embodiment, each of the composite legs 162 is slideably disposed into a box-like receiving member 168 coupled to the fuselage 110. A pair of attachment members 170 are disposed through each receiving member 168 and composite leg 162, securing each composite leg 162 to its corresponding receiving member 168. In a first (or non-loaded) position 172, such as just prior to landing or shortly after takeoff, each of the composite legs 162 projects downwardly in a relaxed (or non-loaded) orientation to ensure that the landing wheels 164 are in a proper position for landing or take off. In a second (or loaded) position 174, however, each of the composite legs 162 may be bent upwardly by the forces associated with landing the aircraft 100. The amount of upward bending of each composite leg 162 depends upon several variables, including the weight of the aircraft 100, the vertical landing velocity, and the flexibility of the composite legs 162.

As shown in FIG. 2, the upward bending of each composite leg 162 may be characterized by a radius of curvature p of the composite leg 162, and also by a deflection distance d which is the distance the landing wheel 164 is deflected upwardly between the non-loaded position 172 and the loaded position 174. The radius of curvature p of the composite leg 162 may be estimated by the following equation:

$$\rho = h_B / (\epsilon_t + \epsilon_c)$$

where $h_B$ is a dimension (or beam height) of the composite leg 162, $\epsilon_t$ is a strain in tension of the composite leg 162, and $\epsilon_c$ is a strain in compression of the composite leg 162.

As further shown in FIG. 3, in this embodiment, the receiving member 168 includes a structurally-weakened portion (or "plow field") 171 proximate each of the attachment members 170. The structurally-weakened portions 171 may be adapted to provide the necessary strength and rigidity characteristics for the nominal loads experienced during normal flight and normal landing operations. The structurally-weakened portions 171 may be further adapted, however, to intentionally "fail," deform, bend, or otherwise "give way" under certain non-nominal load conditions, such as those that may be experienced during an abnormally hard landing. In one particular embodiment, for example, the structurally-weakened portions 171 are adapted to fail at a design point that is selected based on the load limit of the composite leg 162. In other words, the structurally-weakened portions 171 may be adapted to fail prior to a failure point of the composite leg 162, thereby absorbing some of the energy of impact associated with an abnormally hard landing, and possibly preventing breakage of the composite leg 162.

Figure 4:
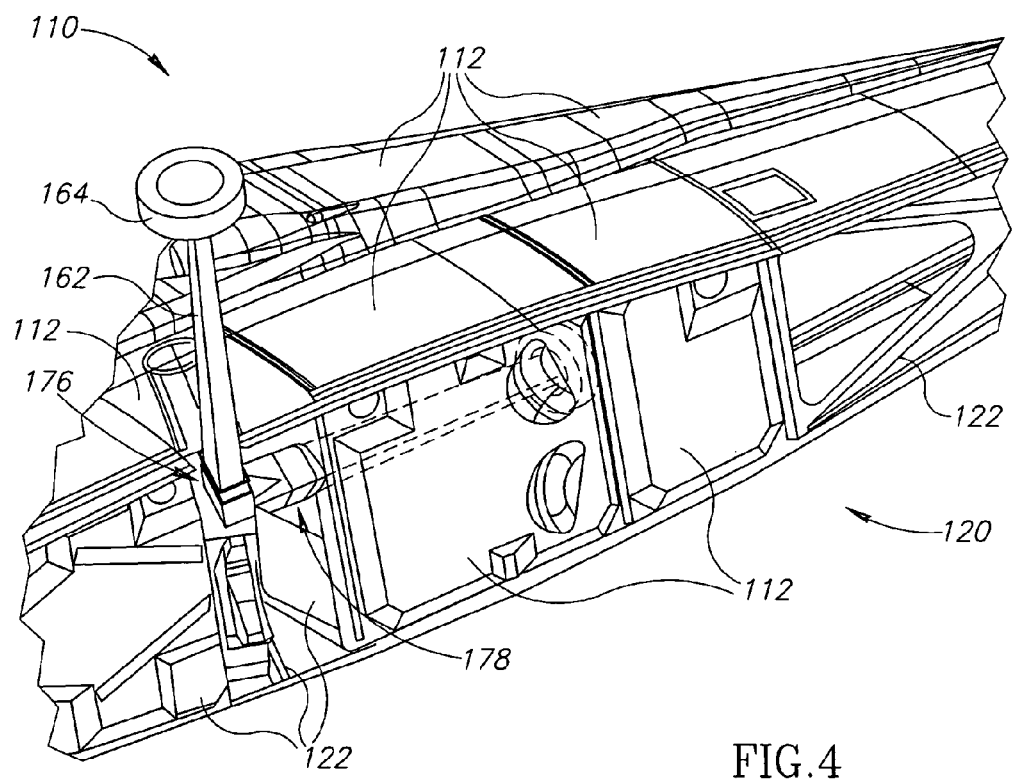
FIG. 4 is an enlarged, partial isometric view of a portion of aircraft of FIG. 1.

FIG. 4 is an enlarged, partial isometric view of a portion of the aircraft 100 of FIG. 1. In this embodiment, the fuselage 110 of the aircraft 100 includes a plurality of fuselage components 112 that are coupled to a frame assembly 120. The frame assembly 120 includes a plurality of frame members 122. In one embodiment, at least some of the fuselage components 112 and frame members 122 are formed of composite materials.

Figure 5:
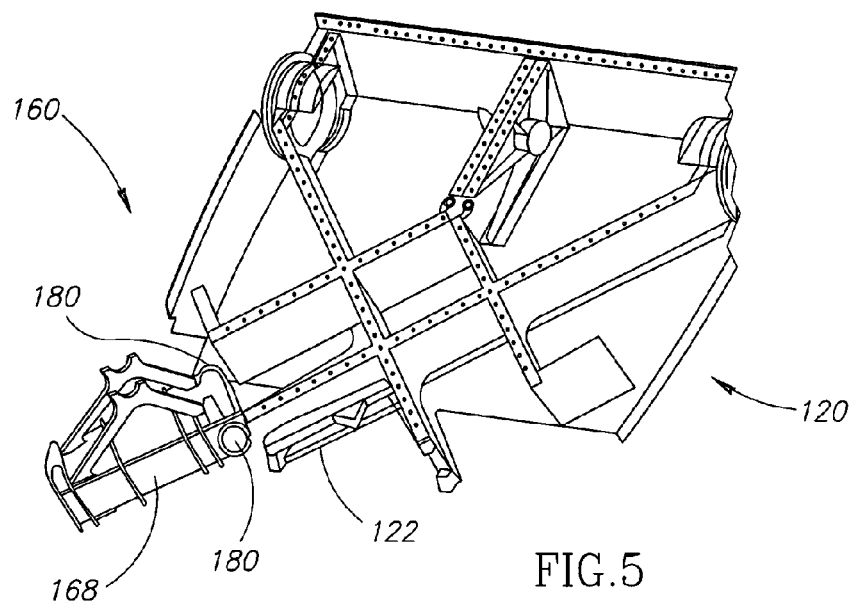
FIG. 5 is an isometric, exploded view of a portion of the landing gear assembly of FIG. 2.

In some embodiments, the landing gear assembly 160 may be moved between a landing (or deployed) position 176 and a flight (or stowed) position 178. For example, FIG. 5 is an isometric, partially-exploded view of a portion of the landing gear assembly 160 of FIG. 2. More specifically, FIG. 5 is a view of one of the box-like receiving members 168 and one of the frame members 122 to which it is normally coupled (shown separated from the frame member 122 in the exploded view in FIG. 5). As shown in FIGS. 3 and 5, in this embodiment, each receiving member 168 is pivotably coupled to one of the frame members 122 by a pair of bearings 180. The bearings 180 enable the receiving members 168, and thus the composite legs 162, to be moved between the landing position 176 and the flight position 178 (FIG. 4) by a suitable actuator (not shown).

Figure 6:
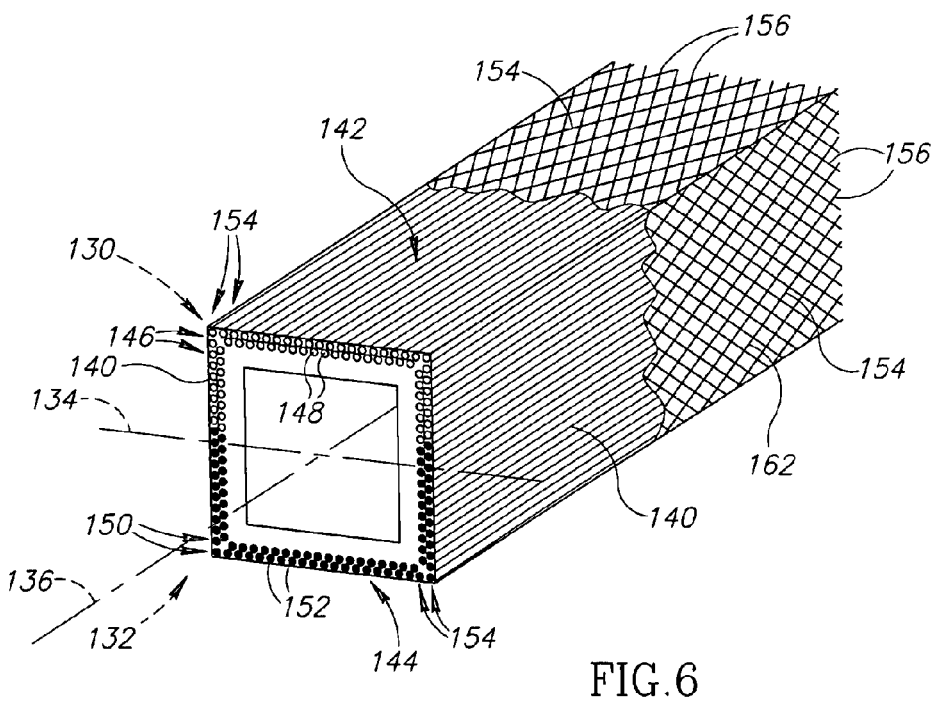
FIG. 6 is an isometric, cross-sectional view of a composite leg of the landing gear assembly of FIG. 1

Reference is now made to FIG. 6, which is an isometric, cross-sectional view of the composite leg 162 of FIG. 2. The composite leg 162 includes a pair of sidewalls 140, and upper wall 142, and a lower wall 144. In this embodiment, the composite leg 162 has an approximately square cross-sectional shape. In other embodiments, the cross-sectional shape may be rectangular, elliptical, tubular, etc.

FIG. 6 shows a leg 162 that is hollow. In other embodiments, however, the leg may be solid, it may be filled (e.g., with foam, a honeycomb core, or other filler), etc.

A reference plane 134 bisects the composite leg 162, and a longitudinal axis 136 extends along a centerline of the composite leg 162. When the leg 162 is in the loaded position (e.g. during landing as shown in FIG. 2), an upper portion 130 of the leg experiences compression loads, a lower portion 132 of the leg 162 experiences tension loads, and the sidewalls 140 experience shear loads.

Consequently, the upper wall 142 and the upper portions of the sidewalls 140 are under compression, while the lower wall 144 and the lower portions of the sidewalls 140 are under tension. The upper and lower portions 130, 132 are not necessarily separated by the reference plane 134. For example, in the embodiment shown in FIG. 6, the lower portion 132 extends from below the reference plane 134 to slightly above the reference plane 134. A "compression cap" is formed by the upper wall 142 and those portions of the sidewalls 140 above the plane 134. A "tension cap" is formed by the lower wall 144 and those portions of the sidewalls 140 below the plane 134.

The compression cap includes plies 146 of reinforcing fibers 148 that provide strength in compression. The tension cap includes plies 150 of reinforcing fibers 152 that provide strength in tension. The fibers 148 and 152 in the caps extend lengthwise along the leg 162.

In some embodiments, the cap fibers 148 and 152 may be oriented at zero degrees with respect to the longitudinal axis 136. Thus, compression and tension loads will be transmitted primarily along the fibers 148 and 152.

In other embodiments, the cap fibers 148 and 152 are oriented at $+\alpha$ and $-\alpha$ with respect to the longitudinal axis 136. For the cap fibers 148 and 152 in these embodiments, a value of $\alpha$ between 2 and 8 degrees will suppress or delay ply splitting. Fibers oriented at angles of $+\alpha$ and $-\alpha$ are described in greater detail in pending U.S. Ser. No. 12/340,631, which is incorporated herein by reference.

The compression cap may have a greater number of plies 146 than the tension cap, making it thicker than the tension cap. Making the compression cap 20-40% thicker than the tension cap can result in as much as a 3% improvement in strength-to-weight ratio of the leg 162.

The composite leg 162 further includes a torque box 154. The torque box 154 is formed on or in the sidewalls 140 and the upper and lower walls 142 and 144. The torque box 154 includes plies of carbon reinforcing fibers 156 oriented at angles of $+v$ and $-v$ with respect to the longitudinal axis 136 of the leg 136 (the carbon fibers 156 in a ply may be cross-woven). The value of $v$ is between 35 and 55 degrees. The carbon fibers 156 provide torsional rigidity and carry shear flow between the caps. For example, the torque box 154 may be designed to provide sufficient torsional rigidity to substantially prevent wobble in order to allow the landing wheels 164 to track properly during landing of the aircraft 100.

Because the carbon fibers are oriented at $35 \leq v \leq 55$, they do not see the same strain as the cap fibers 148 and 152. Instead, the carbon fibers 156 tend to "scissor" while the cap fibers are undergoing large deflections. This mechanism allows the carbon fibers 156 to survive while the leg 162 is undergoing large deflections (e.g., 20,000 microinches).

In some embodiments, the cap fibers 148 and 152 are formed of a glass material (GS) such as fiberglass, while the torque box 156 are formed from carbon (CB). In other embodiments, the compression cap fibers 148 may be formed of a glass material (GS) while the tension cap fibers 152 are formed from a plastic (or organic) material (P). Examples of plastic fibers 152 include, but are not limited to, aramid fibers, polyethylene fibers (e.g., high molecular weight polyethylene fiber) and other suitable high-strength plastic fibers (e.g., p-phenylene benzobisoxazole fibers, polyarylate fibers). Plastic fibers are used in the tension cap only because they have poor compression values. A leg 162 having plastic fibers in the compression cap has a lighter weight than a leg having a glass compression cap. However, a leg 162 having both caps made of glass is less expensive.

Figures 7, 8:
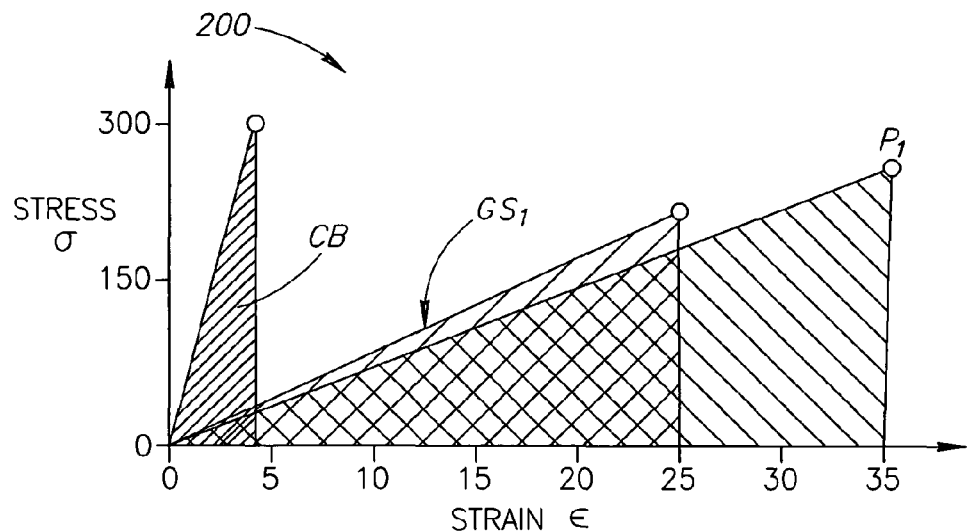
FIG. 7 is a representative graph of stress versus strain for carbon, a glass, and a plastic material
FIG. 8 is a representative table of various material properties for various fiber materials.

FIG. 7 is a representative graph 200 of stress versus strain for carbon (CB), a glass ($GS_1$), and a plastic ($P_1$) material. Similarly, FIG. 8 is a representative table 300 of various material properties for various fiber materials, including carbon (CB), a glass ($GS_1$), and a plastic ($P_1$). The area under the stress versus strain curve for each material represents the amount of energy that may be absorbed by the material during an impact, such as during landing. The glass material ($GS_1$) can absorb more energy than carbon (CB), and the plastic material ($P_1$) can absorb more energy than both the glass material ($GS_1$) and carbon (CB). Furthermore, as shown in FIG. 8, the glass material is more dense (i.e. heavier) than carbon, while the plastic material ($P_1$) is less dense (i.e. lighter) than both carbon (CB) and the glass material ($GS_1$). By proper selection of materials for the cap fibers 148 and 152, the compression cap may be designed to exhibit desired compression strength characteristics (e.g. a desired $\epsilon_c$), and the tension cap may be designed to exhibit desired tensile strength characteristics (e.g. a desired $\epsilon_t$).

In one particular embodiment, fiberglass unidirectional tape (or glass planks) (e.g. E-glass) with a modulus of approximately 5 MSI may be used to form the compression and tension caps of the composite leg 162 to achieve very high deflections required for energy absorption. Similarly, graphite (GR) bidirectional weave (e.g. T-300 at ±45 degrees) may be placed in an interleaved fashion between the glass plies. The fibers of the graphite weave transfer shear, provide torsional rigidity (for improved ground handling stability of the aircraft 100), and prevent transverse cracking of the glass and to improve transition of the loads into the attachment members 170.

The resulting embodiment of the composite leg 162 may flex a substantial amount. Referring to the equation above for determining radius of curvature p, strains are driven up to make the radius of curvature smaller and deflections larger so more energy can be absorbed. In one particular embodiment, strain levels exceeding 20,000 micro-inch may be achieved. Consequently, a landing gear assembly herein can absorb large impacts upon landing via large leg deflections as compared to traditional landing assemblies, which use articulated structures.

Embodiments herein may provide other significant advantages over traditional landing gear assemblies. Traditional landing gear assemblies typically use steel forgings, which require relatively expensive tooling, and which make the assemblies undesirably heavy. A traditional landing gear assembly typically weighs between about 5 to 10 percent of max takeoff weight. Embodiments herein, however, may weigh between about 2 to 5 percent of max takeoff weight, a weight savings of approximately 50% and avoid the cost of expensive forging tools.

Moreover, the use of high elongation fibers in the tension cap, high compression fibers in the compression cap, and relatively-stiff carbon fibers in the torque box, the composite legs 162 may provide significantly enhanced structural performance in comparison with traditional landing assemblies. The composite leg 162 described herein may flex a substantial amount to absorb energy during abnormal landing conditions, yet may still maintain highly desirable strength and weight characteristics. Furthermore, because the receiving member 168 includes the structurally-weakened portions 171, the receiving member 168 is further adapted to absorb additional energy during landing of the aircraft 100. In this way, embodiments of the present invention may advantageously prevent damage to other portions of the aircraft 100 during landing.

In the event that an abnormal landing condition causes damage to a receiving member 168 (e.g. by causing the attachment members 170 to deform the "plow fields" 171), the receiving member 168 may be easily replaced. The closed cell (or box beam) construction of the composite leg 162 suppresses free edge effects (e.g. delamination) that might otherwise occur in alternate designs due to abnormal loading conditions. Also, because the composite leg 162 is received within and attached to the retaining member 168 using a relatively simple design, repair and replacement of composite legs 162 that have been damaged is simplified. Therefore, a landing gear assembly herein may improve the maintainability and overall cost of operating the aircraft 100 in comparison with traditional landing gear assemblies.

Further improvement of the composite leg 162 can be obtained by additional plies of carbon fibers that form pads around the attachment members 170. The pads protect the composite leg 162 from damage during deformation of the attachment members 170. The pads also reduce damage during fabrication, by providing a thicker structure through which to drill holes for the attachment member 170.

The invention claimed is:

1. A composite leg for a landing gear assembly, the composite leg comprising:
a composite compression cap including reinforcing fibers that provide strength in compression; and
a composite tension cap including reinforcing fibers that provide strength in tension;
wherein at least some of the fibers are oriented at $+\alpha$ and $-\alpha$ with respect to a longitudinal axis of the leg, where $\alpha$ is between 2 and 8 degrees.

2. The composite leg of claim 1, further comprising a torque box for providing torsional rigidity of the leg and carrying shear flow between the caps.

3. The composite leg of claim 2, wherein plies of reinforcing fibers in the torque box are interleaved with plies of the fibers in the caps.

4. The composite leg of claim 3, wherein the reinforcing fibers in the torque box have a lower strain of compression than the fibers that provide the strength in compression and a lower strain of tension than the fibers that provide strength in tension.

5. The composite leg of claim 1, wherein the fibers providing the strength in compression include glass fibers and wherein the fibers providing strength in tension include plastic fibers.

6. The composite leg of claim 1, wherein the fibers providing strength in compression and tension both include glass fibers.

7. The composite leg of claim 1, wherein the compression cap is 20-40% thicker than the tension cap.

8. The composite leg of claim 1, wherein the compression cap and the tension cap have the same thickness.

9. The composite leg of claim 1, wherein the leg has holes for receiving attachment members, and wherein the leg further includes thickened pads of carbon fibers are around the holes.

10. A landing gear assembly comprising at least one composite leg of claim 1.

11. An aerospace vehicle comprising:
a fuselage; and
a landing gear assembly coupled to the fuselage, the landing gear assembly including at least one composite leg of claim 1.

12. The composite leg of claim 1, further comprising a torque box for providing torsional rigidity of the leg and carrying shear flow between the caps.

13. The composite leg of claim 12, wherein the torque box includes plies of reinforcing fibers that are interleaved with plies of the fibers in the caps.

14. The composite leg of claim 13, wherein the reinforcing fibers in the torque box have a lower strain of compression than the fibers in the compression cap and a lower strain of tension than the fibers in the tension cap.

15. The composite leg of claim 13, wherein the reinforcing fibers in the torque box include carbon fibers, the fibers in the composite compression cap include glass fibers, and the fibers in the composite tension cap include plastic fibers.

16. A landing gear assembly leg comprising:
a composite compression cap including reinforcing fibers oriented at $+\alpha$ and $-\alpha$ with respect to a longitudinal axis of the leg; and
a composite tension cap including reinforcing fibers oriented at $+\alpha$ and $-\alpha$ with respect to the longitudinal axis of the leg;
where $\alpha$ is between 2 and 8 degrees.

17. The composite leg of claim 16, wherein the compression cap and the tension cap have the same thickness.

18. The composite leg of claim 16, wherein the leg has holes for receiving attachment members, and wherein the leg further includes thickened pads of carbon fibers are around the holes.

19. A landing gear assembly comprising at least one composite leg of claim 16.

20. An aerospace vehicle comprising:
a fuselage; and
a landing gear assembly coupled to the fuselage, the landing gear assembly including at least one composite leg of claim 16.

* * * * *